United States Patent [19]

Callahan, Jr. et al.

[11] Patent Number: 5,599,618

[45] Date of Patent: Feb. 4, 1997

[54] METHOD OF MAGNETICALLY AND/OR ELECTROSTATICALLY POSITIONING PRESSURE-SENSITIVE ADHESIVE BEADS AND MAGNETICALLY POSITIONABLE PRESSURE-SENSITIVE

[75] Inventors: Joseph P. Callahan, Jr., St. Paul; Rudyard M. Enanoza, Woodbury; Michael S. Groess, Oakdale; Mark D. Weigel, Vadnais Heights, all of Minn.

[73] Assignee: Minnesota Mining and Manufacturing Company, St. Paul, Minn.

[21] Appl. No.: 339,925

[22] Filed: Nov. 15, 1994

Related U.S. Application Data

[63] Continuation of Ser. No. 28,424, Mar. 9, 1993, abandoned.

[51] Int. Cl.$^6$ .................................................... B32B 5/16
[52] U.S. Cl. ........................ 428/323; 428/403; 428/692; 428/900; 428/913
[58] Field of Search ................................. 428/323, 328, 428/329, 403, 692, 900, 913

[56] References Cited

U.S. PATENT DOCUMENTS

| | | | |
|---|---|---|---|
| 2,907,682 | 10/1959 | Eichel | 117/122 |
| 2,988,460 | 6/1961 | Eichel | 117/122 |
| 2,988,461 | 6/1961 | Eichel | 117/122 |
| 3,786,116 | 1/1974 | Milkovich et al. | 260/885 |
| 4,091,162 | 5/1978 | Henderson et al. | 428/327 |
| 4,254,201 | 3/1981 | Sawai et al. | 430/111 |
| 4,259,426 | 3/1981 | Hasegawa et al. | 430/98 |
| 4,427,481 | 1/1984 | Smith et al. | 156/306.6 |
| 4,833,018 | 5/1989 | Ruehl et al. | 428/332 |
| 4,833,179 | 5/1989 | Young et al. | 522/183 |
| 4,876,172 | 10/1989 | Hillenbrand | 430/253 |
| 4,877,707 | 10/1989 | Grushkin et al. | 430/106.6 |
| 4,877,708 | 10/1989 | Hosoi | 430/126 |
| 4,879,199 | 11/1989 | Gruber et al. | 430/137 |
| 4,952,650 | 8/1990 | Young et al. | 526/194 |
| 5,322,731 | 6/1994 | Callahan et al. | 428/327 |

FOREIGN PATENT DOCUMENTS

| | | | |
|---|---|---|---|
| 53036243 | 4/1978 | Japan | G03G 9/08 |
| 54054154 | 7/1979 | Japan | C09J 3/16 |
| 60118774 | 6/1985 | Japan | C09J 3/00 |
| 60-124679 | 7/1985 | Japan | C09J 7/02 |
| 62-3192 | 1/1987 | Japan | F04C 18/352 |
| 63-273680 | 11/1988 | Japan | G09J 5/00 |
| 2-102280 | 4/1990 | Japan | |
| 04182663 | 6/1992 | Japan | G03G 9/08 |
| 989264 | 4/1965 | United Kingdom | |
| WO92/20722 | 11/1992 | WIPO | C08F 220/18 |

OTHER PUBLICATIONS

The Physics and Technology of Xerographic Processes, Edgar M. Williams, Chapter 7, pp. 120–153, 1984.

ASTM D150–92, Standard Test Methods for A–C Loss Characteristics and Permittivity (Dielectric Constant) of Solid Electrical Insulating Materials, 1984 pp. 30–48.

Electrophotography, Second International Conference, 1974, Ed. Dr. Deane R. White, pp. 95–123.

*Primary Examiner*—Hoa T. Le
*Attorney, Agent, or Firm*—Gary L. Griswold; Walter N. Kirn; Janice L. Dowdall

[57] ABSTRACT

The present invention provides pressure-sensitive adhesive beads that comprise a tacky pressure-sensitive adhesive core and a non-tacky shell material that surrounds the area wherein the beads are capable of being positioned via magnetic means. The present invention also provides method(s) of preparing adhesive coated substrates using pressure-sensitive adhesive bead(s) that are magnetically responsive, electrostatically responsive or both by using magnetic forces, electrostatic forces or both.

6 Claims, 2 Drawing Sheets

5,599,618

METHOD OF MAGNETICALLY AND/OR ELECTROSTATICALLY POSITIONING PRESSURE-SENSITIVE ADHESIVE BEADS AND MAGNETICALLY POSITIONABLE PRESSURE-SENSITIVE

This is a continuation of application Ser. No. 08/028,424 filed Mar. 9, 1993, (now abandoned).

FIELD OF THE INVENTION

The invention relates to a method of positioning pressure-sensitive adhesive bead(s) comprising a pressure-sensitive adhesive core and a non-tacky shell material that surrounds the core wherein the pressure-sensitive adhesive bead(s) can be positioned via magnetic means, electrostatic means, or a combination thereof.

This invention also relates to pressure-sensitive adhesive bead(s) which comprise a pressure sensitive adhesive core and a non-tacky shell material that surrounds the core wherein the bead(s) are capable of being positioned on a substrate via magnetic means.

BACKGROUND OF THE INVENTION

Microencapsulated adhesive beads are generally understood to comprise a shell which surrounds or encapsulates a liquid or solid adhesive core. The shell is impervious to the core material and is sufficiently strong so as to prevent exposure of the core during normal handling of the beads. However, upon the application of heat, pressure, mechanical force, or the like, the shell fractures, ruptures, dissolves, or is absorbed by the core thereby exposing the core. Microencapsulation is discussed in *Microcapsules and Microencapsulation Techniques*, by M. H. Gutcho (published by Noyes Data Corporation, Park Ridge, N.J., 1976) and *Microcapsule Processing and Technology*, by A. Kondo, edited by J. W. Van Valkenburg, published by Marcel Dekker, Inc., New York, N.Y., 1979. Described are limited utilities for the shell materials such as core retention, detackification, or as a portion of the adhesive system.

Two commonly employed techniques to produce microencapsulated adhesive beads are coacervation and in situ polymerization. In coacervation, a continuous shell is formed when a water soluble polymer is condensed from an aqueous solution. The shell forms about a nucleus of material which becomes the core. Shells of this type based on gelatin and gum arabic are well known.

For example, U.S. Pat. No. 2,907,682 "Adhesive Tape Containing Pressure Rupturable Capsules," issued Oct. 6, 1959 to H. J. Eichel discloses an adhesive tape comprising a web having a coating of two types of pressure-rupturable capsules thereon. One type of capsule contains a liquid solvent; the other contains a substantially solid adhesive that is soluble in the solvent. When pressure is applied to the tape, the capsules rupture and the adhesive and solvent become mixed. The capsules include a hard shell formed by coacervation from gelatin and gum arabic. These beads are coated onto the substrate in dispersion form and dried.

U.S. Pat. No. 2,988,460, "Adhesive Tape," issued Jun. 13, 1961 to H. J. Eichel discloses an adhesive tape comprising a web coated with pressure-fracturable capsules. Each capsule includes a hard shell which surrounds an adhesive core. The capsules are formed by coacervation and are coated in dispersion. Upon the application of pressure at a temperature substantially above 100° F. (37.8° C.), the shells fracture and the adhesive cores become tacky and flow. U.S. Pat. No. 2,988,461, "Adhesive," issued Jun. 13, 1961 to H. J. Eichel is similar to the immediately preceding patent except that the application of pressure without heat is required to activate the adhesive. In this case as well the adhesive is coated in dispersion form.

Japanese Kokai Patent No. 63-273680, "Capsule Type Adhesive and Adhesion Method Using Capsule Type Adhesive," Published Nov. 10, 1988, discloses an oil with an adhesive dissolved therein. The oil is sealed in a gelatin capsule. Applying pressure to the capsule causes the same to break thereby releasing the oil/adhesive blend. There is no mention of the coating technique involved using the capsule adhesive.

Japanese Patent Publication No. 60-124679, "Pressure Sensitive Adhesive Sheet" published Jul. 3, 1985 discloses several adhesive microcapsules. For example, FIG. 2(*d*) contained in Japanese Patent Publication No. 60-124679 illustrates a pressure-sensitive adhesive core covered by a fine inorganic powder and then encapsulated by a polymer film which is obtained by coacervation. Pressure is applied to the microcapsule to expose the adhesive core. The beads are subsequently coated using a simple primer coat with spray coating of the adhesive dispersion or dust coating of a dry adhesive material.

"In Situ" polymerization is a second commonly employed technique for producing microencapsulated adhesive beads. A shell formed of a gaseous, liquid, water or oil soluble monomer or a low molecular weight polymer is polymerized on the surface of a core material to provide a polymer film which covers the entire surface of the core material. Shells based upon urea-formaldehyde are well known. A variety of materials including homopolymers, copolymers, graft copolymers and block copolymers may be used to form the shell. For example, British Patent Specification No. 989,264, "Microcapsules and Method of Producing Them," published Apr. 14, 1965, discloses microcapsules comprising discrete, distinct and continuous aminoplast shell walls upon water-immiscible inert solid or liquid fill particles. No coating techniques are described. In situ polymerization is also mentioned in Japanese Kokai Patent No. 2-102280, "Microencapsulated Pressure Sensitive Adhesive Agent," published Apr. 13, 1990, which discloses a pressure sensitive adhesive agent in a non-pressure sensitive adhesive shell which surrounds the agent. A dust coating technique is employed.

Adhesive beads are also discussed in other publications. For example, U.S. Pat. No. 4,091,162, "Adhesives," issued May 23, 1978 to Henderson et al. discloses a "core-shell" polymer particle comprising a soft, tacky polymeric core surrounded by a hard, non-tacky non-blocking polymeric shell. The polymer shells render the adhesive beads non-blocking (i.e., non-agglomerating) in a latex dispersion which then may be coated from the dispersion, from solution, or by hot melt. The beads are formed by polymerizing the core followed by polymerizing the shell about the core. A typical "core-shell" polymer particle is illustrated in FIG. 1 of the Henderson et.al. patent.

Japanese Kokai Patent No. 2-102280 discloses a similar technique for producing a structure which includes an adhesive core and a non-adhesive shell which involves polymerizing a core followed by polymerizing the shell about the core. The above-mentioned Japanese Patent Publication No. 60-124679 discloses three adhesive microcapsules other than the coacervate structure illustrated in drawing FIG. 2(d). FIG. 2(a) shows an adhesive microcapsule in which a frozen and ground pressure sensitive adhesive is mixed with a rosin-like or terpene-like resin to form a powder that reportedly flows well at room temperature. The adhesive microcapsule illustrated in drawing FIG. 2(b) apparently comprises the adhesive microcapsule of FIG. 2(a) further coated with an inorganic powder such as silica, bentonite, alumina or talc so as to enhance the flowability of the microcapsules. The adhesive microcapsule of FIG. 2(c) comprises an adhesive core coated with an inorganic powder only.

Young et al., U.S. Pat. Nos. 4,833,179 and its divisional 4,952,650, "Suspension Polymerization," issued May 23, 1989 and Aug. 28, 1990, respectively, disclose the production of non-agglomerating pressure sensitive adhesive beads by suspension polymerization. The beads include an inorganic coating of silica powder which surrounds an adhesive core. Application of the beads by hot melt coating is described.

The above-mentioned references that describe an adhesive core surrounded by a shell fail to disclose a shell which has the ability to be used in any way in the positioning of the pressure sensitive adhesive core.

Japanese Patent Publication No. 62-3192, "Powder Adhesive for Electrostatic Gravure Printing," published Jan. 23, 1987, discloses the ability of a shell material to be electrostatically charged for the purpose of gravure coating of powdered hot melt adhesives. Only non-pressure sensitive adhesives with limited size (5μ to 40μ), charge levels, and charging methods (corona discharge) are disclosed. These are claimed to be useful for electrostatic gravure printing methods only.

U.S. Pat. No. 4,427,481, "Magnetized Hot Melt Adhesive And Method of Preparing Same," issued Jan. 24, 1984 to Mulik et.al. discusses installing a permanently magnetized ferromagnetic substance into a hot melt adhesive thereby creating a dispersion. It is then formed into a strip material which in turn can be positioned prior to activation of the hot melt adhesive. Upon application of heat the material flows and the magnetized particles draw the adhesive into the joint to be sealed. The patent does not teach a detackified PSA bead containing a magnetically responsive material.

Adhesive beads, in general, have been applied to substrates by a number of means such as from dispersions, from solutions, via hot melt applications and by dusting. Hot melt applications can be particularly disadvantageous in that the application process may require a high temperature which can result in the degradation of the adhesive. Furthermore, methods of pattern coating such as gravure coating can be inconvenient due to the need to substitute a new roll for each pattern which can be time consuming as well as expensive.

SUMMARY OF THE INVENTION

A need exists for an alternative method of applying adhesive to a substrate, particularly as a 100% solid system. A need particularly exists for a method of pattern coating 100% solid adhesives without the inherent disadvantages of hot melt adhesive systems. We have discovered such a method. A need also exists for an adhesive which can easily be applied to a substrate via a solventless system. We have discovered such an adhesive.

The present invention relates to a method of coating PSA beads via electrostatic means, magnetic means, or both, prior to their activation. The pressure-sensitive adhesive bead(s) useful according to the method of the invention comprise a pressure-sensitive adhesive core with a continuous or discontinuous shell coating on the surface thereof, with the nature of the shell being that it has the ability to hold an electrostatic charge and/or the nature of the bead being that it is magnetically responsive such that it is useful in the positioning or transport of the PSA bead.

The method of the invention for providing a pressure-sensitive adhesive bead coated substrate comprises the steps of:

(a) providing a substrate and a pressure-sensitive adhesive bead(s) wherein each of the bead(s) comprises a pressure-sensitive adhesive core and a tack-free shell therearound, wherein the pressure-sensitive adhesive bead(s) is electrostatically chargeable, magnetically responsive, or both;

(b) positioning the bead(s) on a substrate by a means selected from the group consisting of electrostatic force(s), magnetic force(s), both electrostatic forces and magnetic forces to form a tack-free coating of the bead(s) on the substrate.

The method may further comprise a step (c) of activating the bead(s) on the substrate to expose the pressure-sensitive adhesive core and provide a coating of the pressure-sensitive adhesive on the substrate.

The invention also provides an adhesive bead comprising a pressure-sensitive adhesive core and a tack free shell therearound, wherein the bead is capable of being applied to a substrate via magnetic means. The adhesive beads of the invention are environmentally advantageous in that they are produced via a solventless process and thus emit no solvents upon coating.

BRIEF DESCRIPTION OF THE DRAWINGS

The invention will be more fully understood with reference to the following figures.

DETAILED DESCRIPTION OF THE INVENTION

Figure 1:
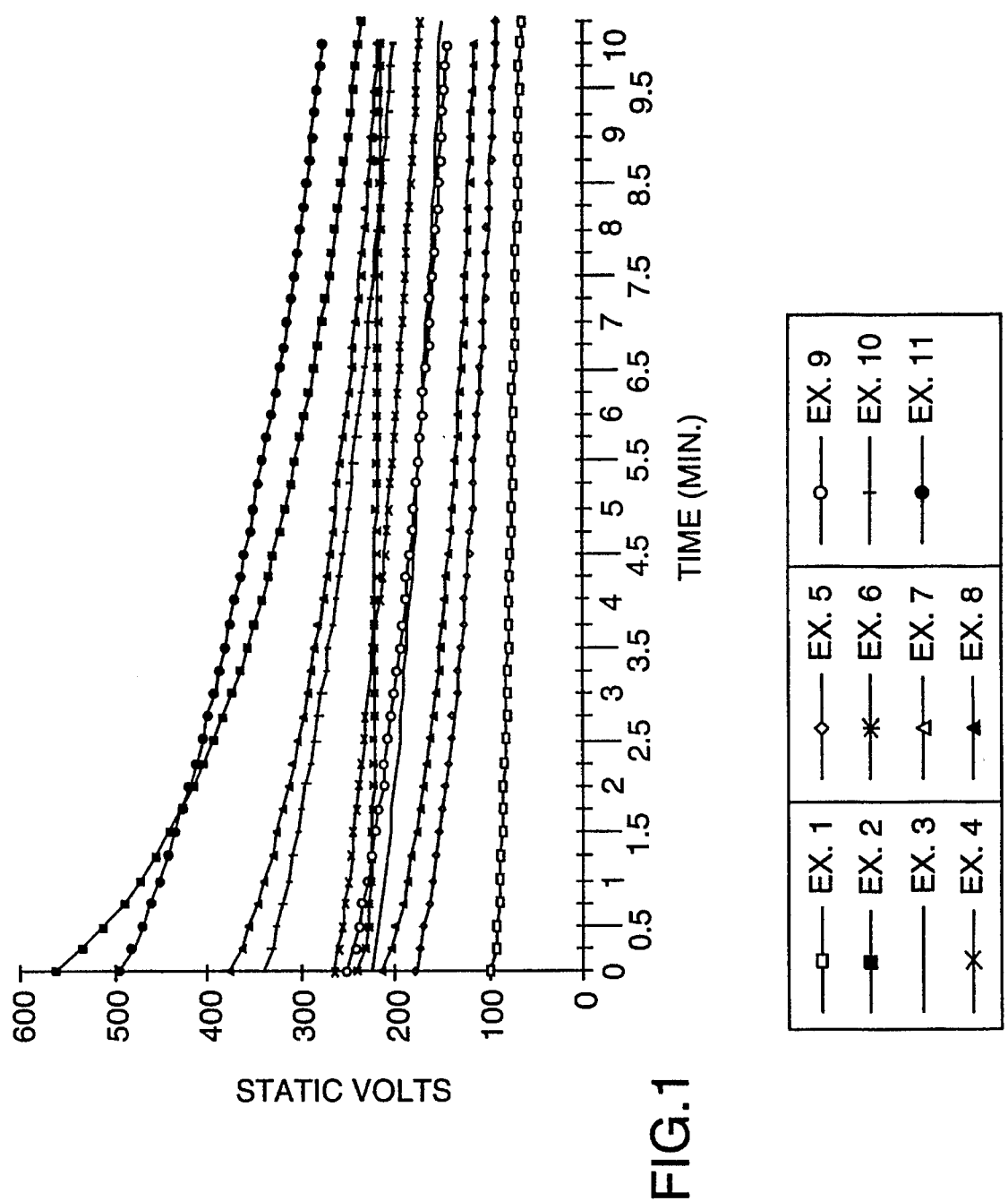
FIG. 1 illustrates a graph depicting the static voltage versus time for the beads of Examples 1 to 11.

The pressure-sensitive adhesive bead useful according to the method of this invention comprises a core comprising a pressure-sensitive adhesive and a shell disposed about the core. This shell may be either continuous or discontinuous in nature as long as it detackifies the pressure-sensitive adhesive core. The shell is of a nature as to be able to have imparted an electrostatic charge to the surface and/or the shell may be magnetically responsive and/or the core may be magnetically responsive.

Pressure-Sensitive Adhesive Cores

Core will sometimes be referred to herein as "the pressure-sensitive adhesive core", it being understood that this means that the core comprises a pressure-sensitive adhesive material. As used herein, "pressure-sensitive adhesive material" means a material which displays pressure-sensitive tack; that is, a material which is tacky when touched with light pressure. However, as explained below, the shell renders the bead nontacky. The PSAs which make up the PSA cores are typically of the type which would provide useful PSA coated materials such as sheet materials, (e.g., tapes, labels, and the like) metals, plastics, ceramics, etc.

The pressure-sensitive adhesive core can comprise a variety of adhesives. The pressure-sensitive adhesive cores may be derived from adhesives including but not limited to those selected from the group consisting of polyacrylates, conventional rubbers including but not limited to those selected from the group consisting of natural rubbers, styrene-butadiene block copolymers, elastomeric rubbers such as butyl rubber and poly(alpha-olefins), and blends thereof. Plasticizers and/or tackifiers are generally added to produce the desired pressure-sensitive adhesive properties. Still other suitable adhesive cores include those selected from the group consisting of vinyl ether polymers and silicone pressure-sensitive adhesives, both of which may be blended with acrylic pressure-sensitive adhesives or prepared as acrylic copolymers. For all of these PSA cores the same shell coatings may be employed.

The diameter of the PSA core can vary depending upon the application desired. Typically the diameter of the PSA core ranges from about 10 microns to about 3200 microns, preferably about 25 to about 500 microns. Typically, beads having a smaller core diameter will provide a more continuous PSA coating on a substrate on which they are coated and activated. Conversely, beads having a greater core diameter will provide a more discontinuous coating on a substrate on which they are coated and activated. However, beads having a smaller core diameter tend to have a higher shell to core ratio thus resulting in a coating which provides lower adhesion values.

The pressure-sensitive adhesive cores may be prepared by a number of techniques. For example, the PSA cores may be prepared by granulating a bulk pressure sensitive adhesive material at low temperatures (e.g., about −60° C. or below). The pressure-sensitive adhesive may be frozen with liquid nitrogen so as to detackify the adhesive and then ground to provide granular matter useful as the adhesive cores. In addition, the PSA cores may be prepared by an aqueous suspension technique, such as the cores described below.

A polyacrylate pressure sensitive adhesive core may be prepared by an aqueous suspension polymerization process similar to that disclosed in U.S. Pat. No. 4,833,179 and U.S. Pat. No. 4,952,650, which patents are both incorporated by reference herein. In general, the suspension polymerization technique described in these patents involves the steps of:

(1) preparing a monomer premix comprising:
   (a) acrylic acid ester(s) of a non-tertiary alcohol, the alcohol having from 1 to 18 carbon atoms, with the average number of carbon atoms being about 4 to about 12;
   (b) a functional monomer copolymerizable with the acrylic acid ester;
   (c) a free-radical initiator; and
   (d) a chain transfer agent;
(2) combining the premix with a water phase containing a dispersion aid and/or a stabilizer to form a suspension; and
(3) concurrently agitating the suspension to permit the polymerization of the monomer premix until the pressure-sensitive adhesive cores form.

Alkyl acrylate monomers (i.e. acrylic acid ester monomers) useful in preparing the pressure-sensitive adhesive include but are not limited to monofunctional, unsaturated acrylate ester monomers. Included within this class of monomers are, for example, isooctyl acrylate, isononyl acrylate, 2-ethylhexyl acrylate, decyl acrylate, dodecyl acrylate, n-butyl acrylate, hexyl acrylate, and mixtures thereof. The acrylate monomers comprise at least about 70 parts by weight based on 100 parts by weight total monomer content, preferably from about 75 parts by weight to about 90 parts by weight. Unless indicated otherwise, all parts are parts by weight.

Alkyl fumarates and alkyl maleate (based, respectively, on fumaric and maleic acid) may also be successfully used. Examples thereof include but are not limited to those selected from the group consisting of dibutyl maleate, dioctyl fumarate, dibutyl fumarate, and dioctyl maleate.

The functional monomer copolymerizable with the acrylic acid ester, the fumaric acid ester, or the maleic acid ester is incorporated into the monomer premix so as to modify a final property (for example, peel adhesion or shear holding strength) of the resulting adhesive core. The functional monomer may be a polar monomer. "Polar monomers" include both moderately polar and strongly polar monomers. Polarity (i.e., hydrogen-bonding ability) is frequently described by the use of terms such as "strongly," "moderately" and "poorly." References describing these and other solubility terms include "Solvents," *Paint Testing Manual*, 3rd Ed., G. G. Seward, Editor, American Society for Testing and Materials, Philadelphia, Pa., and "A Three-Dimensional Approach to Solubility," *Journal of Paint Technology*, Vol. 38, No. 496, pp. 269–280. Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, and substituted acrylamides. Moderately polar monomers useful herein include N-vinyl lactams such as N-vinyl pyrrolidone, N-vinyl caprolactam, acrylonitrile, and dimethyl amino-propyl methacrylate.

Other monomeric materials which may be used as the functional monomer include macromers of the type disclosed in U.S. Pat. No. 3,786,116 such as 1-polystyrylethyl methacrylate, vinyl esters such as vinyl acetate and vinyl chloride, dialkyl maleate such as dioctyl maleate and dibutyl maleate, dialkyl fumarates such as dioctyl fumarate and dibutyl fumarate, and alkyl methacrylates such as methyl methacrylate.

Mixtures of any of the above noted functional monomers may also be employed. For example, a preferred functional monomer comprises a blend of vinyl acetate, methyl methacrylate and methacrylic acid. The functional monomer may comprise up to about 30 parts by weight of the premix based on the total monomer content, preferably from about 10 to about 25 parts by weight.

Initiators for polymerizing the monomers to provide the adhesive cores of the invention are those which are normally suitable for free-radical polymerization of acrylate, fumarate and maleate monomers and which are oil-soluble and have low solubility in water, which include but are not limited to those selected from the group consisting of organic peroxides such as benzoyl peroxide, lauryl peroxide and various thermal initiators. An example of a useful thermal initiator is 2,2'-azobis(isobutyronitrile), commercially available from E. I. dupont de Nemours & Co. (Wilmington, Del.) under the tradename VAZO™64. The initiator is present in an amount ranging from about 0.05 to about 1 part by weight based on 100 parts by weight total monomer content.

In the course of carrying out the suspension polymerization of these adhesive cores, chain transfer agents, including but not limited to those selected from the group consisting of mercaptans, alcohols, and carbon tetrabromide, may be useful. Representative examples of useful chain transfer agents include those selected from the group consisting of isooctyl thioglycolate, carbon tetrabromide, etc. The chain transfer agent is present in an amount ranging from about 0.01 to about 0.5 part by weight based on 100 parts by weight total monomer content.

If aqueous suspension polymerization is used to prepare these adhesive cores, conventional dispersion aids, stabilizers and, optionally, anionic and nonionic surfactants may be advantageously employed. The amount of surfactant, if included, is preferably from about 2.5 parts per million to about 1.0 part by weight based on 100 parts per weight total monomer content. Representative examples of useful surfactants include those selected from the group consisting of sodium lauryl sulfate, sodium dioctyl sulfosuccinate, and mixtures thereof.

Dispersion aids are those conventionally used in suspension polymerization processes. Typically they are water insoluble or minimally water soluble inorganic powders including but not limited to those selected from the group consisting of tribasic calcium phosphate, calcium carbonate, calcium sulfate, barium sulfate, barium phosphate, hydrophilic silicas, zinc oxide, magnesium carbonate, and mixtures thereof.

Typical stabilizers are water soluble organic compounds, including but not limited to those selected from the group consisting of polyvinyl alcohol, poly-N-vinyl-2-pyrrolidone, polyacrylic acid, polyacrylamide, hydroxyalkyl cellulose, and mixtures thereof. Poly-N-vinyl-2-pyrrolidone and polyvinyl alcohol with a viscosity based molecular weight of about 15,000 to about 630,000 are preferred. The total amount of dispersion aid and stabilizer is present in an amount ranging from about 0.01 part to about 5 parts by weight based on 100 parts per weight total monomer content.

Optionally, photocrosslinking agents may be used in preparing the adhesive cores of the invention. Representative examples of useful crosslinking agents include copolymerizable aromatic ketone monomers, such as acryloxybenzophenone. When present, the photocrosslinker generally comprises from about 0.01 part to about 5 parts by weight based on 100 parts by weight total monomer content.

Various additives may also be included in the monomer premix. Such additives include, for example, bases including but not limited to those selected from the group consisting of ammonia, tertiary amines, sodium hydroxide, barium hydroxide, calcium hydroxide, magnesium hydroxide, potassium hydroxide, lithium hydroxide, and mixtures thereof. These additives comprise from about 0.1 part to about 5 parts by weight based on 100 parts by weight total monomer weight.

According to one method of making the polyacrylate PSA cores the monomers, free-radical initiator, chain transfer agent, and other additives (if included) are blended in the prescribed ratio to form a monomer premix. The monomer premix is then combined with an aqueous phase comprising water, a dispersion aid, a stabilizer, any optional surfactants (all as discussed more fully herein above) and polymerized, with agitation, for about 1 to 10 hours at a temperature of about 45° C. to about 85° C. to give a suspension which contains the preferred adhesive cores. The cores may be washed and separated from the water by means such as gravity filtration. The filtered product generally comprises about 15 to about 30 percent by weight water. The resulting adhesive cores typically have a diameter of about 10 microns ($\mu$) to about 3200 microns and are usually pearl shaped.

Pressure-Sensitive Adhesive Bead Shells

The pressure sensitive adhesive core has a non-tacky shell disposed therearound. As indicated previously, the core may be coated with a shell comprising an electrostatically chargable material and/or the core may be coated with and/or impregnated by a magnetically responsive material.

The shell material of the bead may be used to initially position the PSA bead on the ultimate substrate to be coated or on a first substrate which serves as a transfer medium. If desired one may use a series of transfer media. This positioning on the ultimate substrate and/or the transfer media may be accomplished by the use of electrostatically chargeable shell materials, such as those in the triboelectric series, and/or magnetically responsive materials which are embedded and/or dispersed about the PSA core. Normally, the presence of a static charge on an adhesive bead would be considered a hindrance and therefore undesirable, but we have discovered a variety of novel coating techniques which make use of this heretofore undersirable characteristic. We have also discovered novel coating techniques which make use of our novel magnetically responsive beads.

One form of shell coating is considered to be essentially discontinuous. By "essentially discontinuous" it is meant that the shell coating comprises a multiplicity of discrete particles which substantially surround the inherently tacky core such that the core is not substantially exposed. Another form of shell coating is considered to be essentially continuous. By "essentially continuous", it is meant that the shell while perhaps containing fissures or cracks therein does not comprise a multiplicity of discrete particles which substantially surround the adhesive core but rather a substantially continuous shell.

The particles which surround the core to provide an essentially discontinuous shell are substantially uniform in size and shape. The particles may be provided in a single layer or more than one layer about the core or may be provided in groups or clusters which cooperate so as to substantially surround the core. By "substantially surround" and "not substantially exposed" it is recognized that gaps or spaces may exist between individual particles (or clusters thereof) so long as the surface of core is not exposed to a degree that renders beads not free flowing as explained more fully herein below.

The shell materials can be applied in in-situ polymerization, latex or solvent dispersion form, or as a granulated powder. When the ,shell materials are applied as a granulated powder the pressure-sensitive adhesive cores can be coated by a variety of methods such as by dusting the core with or rolling the core in the granulated powder.

Electrostatically Chargeable Shell Materials

Useful electrostatically chargeable shell materials include a wide variety of non-tacky materials including but not limited to those selected from the group consisting of non-tacky thermoplastic polymers; natural polymers including but not limited to those selected from the group consisting of wool, silk, celluloses such as cotton and linen, starch, gelatin, polysaccharides such as agar and carrageenan, etc.; thermosetting polymers including but not limited to those selected from the group consisting of urea-formaldehyde resins, phenol/resorcinol-formaldehyde resins, melamine-formaldehyde resins; epoxy resins; alkyd resins; organic compounds which can be made in powdered form including but not limited to those selected from the group consisting of rosin esters, terpenes; and electrostatically chargable inorganic materials including but not limited to those selected from the group consisting of silica, titanium dixoide calcium carbonate, ceramics, talc, kaolin, clay, mineral powders such as quartz, asbestos, galena, gypsum, and the like.

According to one method of providing adhesive cores having an electrostatically chargeable and/or magnetically responsive shell so as to form adhesive beads according to the invention, a polymeric material may be combined with the aqueous suspension of formed adhesive cores (if the cores are formed by an aqueous suspension polymerization). An example of such a polymeric material is an organic thermoplastic homopolymer or an organic thermoplastic copolymer derived from a latex of the homopolymer or the copolymer (collectively referred to hereinafter at times as "an organic polymer latex") or derived from a solvent dispersion of the homopolymer or the copolymer (collectively referred to hereinafter at times as "a solvent dispersion of an organic polymer"). Magnetically receptive or magnetized particles (magnetically responsive particles) may or may not be added to the solvent dispersion of organic polymer latex and then dried and ground for the purpose of creating seed particles for the formation of the adhesive cores or for improved attraction of the coated particles during post treatment of the adhesive cores. Alternatively, the material from which the shell is formed may be provided as a granulated powder which may optionally encompass magnetically receptive particles.

By "thermoplastic" is meant a material that is capable of being repeatedly softened by heat and hardened by cooling over a particular temperature range. By "thermosetting" it is meant a material that is capable of being rendered hard by the application of heat. "Latex" refers to an aqueous dispersion of the particular material which is typically produced by emulsion polymerization. By "copolymer" is meant a polymeric material comprised of two or more monomers.

One type of polymer shell of the invention can comprise monomers or mixtures thereof which are polymerized by a free-radical polymerization process such as emulsion, suspension, or bulk polymerization. When the polymer shell is derived from emulsion or suspension polymerization processes using redox (reduction-oxidation) or thermally activated initiators, it is provided in the form of an organic polymer latex. Preferably, the polymer additive is provided as a latex having particles with a diameter of 10µ or less. If desired, the latex may be dried and ground to provide the polymer additive in powder or granulated form. This powder may be used to detackify the adhesive cores. Alternatively, the powder can then be redispersed in an appropriate organic solvent so as to provide a solvent dispersion of the organic polymer. Alternatively, the organic polymer latex may be dissolved in an appropriate organic solvent. Suitable organic solvents include low polarity alcohols such as isopropanol and n-butanol, aliphatic hydrocarbon solvents such as hexane and heptane, aromatic hydrocarbon solvents such as benzene, toluene and xylene, as well as tetrahydrofuran, methyl ethyl ketone, and the like.

Free-radical bulk or solution polymerization requiring thermal or photochemical initiation using organic peroxides, hydroperoxides, azo or diazo compounds may be employed. Other polymerization processes such as cationic, anionic and coordination polymerizations can also provide the polymer shell. References which discuss such processes include F. W. Billmeyer, *Textbook of Polymer Science,* 3rd Ed., Wiley, Interscience 1984, pp. 85–91, incorporated by reference herein, and R. Morrison and R. Boyd, *Organic Chemistry,* 3rd. Ed., Allyn and Bacon, 1973, pp. 1037–1039, incorporated by reference herein.

Cationic polymerization is preferably limited to unsaturated hydrocarbon polymer coatings such that Lewis acids, protonic acids or carbenium ions are typically used as catalysts along with low reaction temperatures. (i.e., usually below room temperature). Anionic polymerization (also known as "living" polymerization) is typically initiated by strong anions derived from alkyl lithium, sodium in liquid ammonia, and the like at room temperature or below to give essentially monodisperse polymers. Coordination polymerization involves Ziegler-Natta catalysts usually employed in fluidized bed processes to give stereospecific polymers. The polymer produced by any of these methods is usually in bulk or semi-bulk form after removal of the solvent or carder, if any was used. Granulation of the resulting product provides the polymer additive in micronized powder form.

Suitable monomers for the formation of either the thermoplastic homopolymer or copolymer include but are not limited to those selected from the group consisting of styrene, vinyl acetate, vinyl chloride, vinylidene chloride, alkyl methacrylates such as methyl methacrylate, ethyl methacrylate or butyl methacrylate and mixtures thereof (i.e., vinyl group and acrylate group containing materials). When the polymer additive is provided as a thermoplastic copolymer, the above monomers may be blended with each other and/or further mixed with a polar comonomer including but not limited to those selected from the group consisting of sodium styrene sulfonate, sodium acrylate, sodium methacrylate, acrylic acid, methacrylic acid, maleic acid, fumaric acid, sodium maleate, sodium fumarate, citraconic acid, vinyl betaines, N-vinyl-2-pyrrolidone, 4-vinylpyridine, acrylamides, substituted acrylamides, and mixtures thereof. Preferred polar comonomers include sodium styrene sulfonate, acrylic acid, sodium acrylate, methacrylic acid, sodium methacrylate, N-vinyl-2-pyrrolidone and acrylamide. When present, the polar comonomer comprises from about 0.5 part to about 10 parts by weight based on 100 parts by weight total monomer content of the organic copolymer coating.

Both the adhesive cores and the shell coatings may contain one or more adjuvants. Preferred adjuvants include those selected from the group consisting of tackifiers, plasticizers, pigments, dyes, extenders, fillers, antioxidants, multifunctional crosslinkers, stabilizers, magnetically responsive materials (discussed infra), and mixtures thereof. An especially preferred additive is bis-vinyl ether which provides high cohesive strength. When present, this additive generally comprises from about 0.5 to about 1 part by weight based on 100 parts by weight total adhesive core monomer content.

Preferably, the thermoplastic homopolymer or copolymer has a glass transition temperature (Tg) of at least about 25° C., more preferably from about 90° to about 95° C., while the adhesive core preferably has a Tg below about 20° C. If the Tg of the homopolymer or copolymer of the shell is less than about 25° C., it may be too close to the Tg of the adhesive core material and, as a result, may tend to blend therewith and possibly materially adversely affect the free-flowing quality of the adhesive beads of the invention.

The following are several specific methods of providing the PSA cores with a shell. The shell material whether provided as an organic polymer latex, a solvent dispersion, or as a powder, may be combined with the pressure-sensitive adhesive cores by several different techniques so as to form adhesive beads according to the invention. In each instance, the shell material is provided in an amount ranging from about 1 part to about 5 parts per 100 parts by weight of adhesive cores, preferably from about 2 parts to about 3 parts.

According to one technique an organic polymer latex derived by emulsion polymerization may be combined with previously formed and filtered adhesive cores and then agitated so as to provide the adhesive cores with an essentially discontinuous organic polymer shell derived from the latex. Alternatively, in situ emulsion polymerization may be employed to prepare a discontinuous coating. According to this approach, the ingredients which provide the shell are blended together and emulsion polymerized in the presence of the previously formed adhesive cores. According to a third technique of preparing a discontinuous shell coating, the ingredients which provide the shell may be added to the adhesive core monomer premix after the exotherm which occurs during the suspension polymerization thereof. The shell materials may then be emulsion polymerized. As a fourth alternative of producing a discontinuous shell coating, an organic polymer latex for forming the shell may be combined with the adhesive core monomer premix prior to the suspension polymerization of the cores. Such an approach may be regarded as an "in-line" process.

Magnetically Responsive Materials

The beads of the invention can comprise one or more magnetically responsive materials to aid in positioning the beads. The term "magnetically responsive materials" as used herein refers to materials with sufficient magnetic attraction so as to be useful in the transport of the PSA bead of the invention onto a transfer medium and/or substrate. Magnetically responsive materials include but are not limited to ferromagnetic materials, salts of ferromagnetic materials, and alloys of ferromagnetic materials, which may or may not be magnetized. For example, a ferromagnetic material may be permanently magnetized to form a magnetically responsive material which is a permanent magnet.

Examples of useful ferromagnetic materials include but are not limited to those selected from the group consisting of iron, cobalt, nickel, gadolinium, dysprosium, including alloys and salts of these metals with other elemental materials including but not limited to those selected from the group consisting of carbon, silicon, aluminum, copper, chromium, manganese, magnesium, titanium, barium, strontium, tungsten, vanadium, niobium, platinum, and silver. Nickel is a preferred ferromagnetic material due to its low cost and low reactivity. Iron is less useful due to its tendency to oxidize.

It is possible to coat the magnetically responsive materials with a material to enhance the affinity of the magnetically responsive material to the PSA core. Such coating is of increased importance when a suspension polymerization is employed in forming the PSA cores since the water phase can cause the magnetically responsive material to phase separate. Preferably, the magnetically responsive particle(s) is coated with a thermoplastic material. Useful thermoplastic materials include but are not limited to those selected from the group consisting of a dispersion of polymeric thermoplastics, such as those derived from acrylates, polyolefins, polystyrenes, and the other shell material discussed infra.

The number and size of the magnetically responsive particles contained within the PSA core or the shell or both can vary. One magnetic particle may be sufficient. However, one magnetic particle would not be sufficient to provide the PSA core with a non-tacky shell. The remainder of the non-tacky shell would thus need to be provided by a non-tacky electrostatically chargeable material (discussed Supra) and/or a neutral inert organic or inorganic non-tacky material which is neither electrostatically chargeable nor magnetically responsive which does not interfere with the PSA properties of the PSA core. Examples of such neutral inorganic materials include but are not limited to those selected from the group consisting of inorganic salts including but not limited to those selected from the group consisting powders of barium sulfate, sodium chloride, calcium sulfate, calcium chloride, sodium sulfate, sodium phosphate, calcium phosphate, mixtures thereof, and the like.

The size and number of the magnetic particles if used without any triboelectric materials must be sufficient to allow for the transfer of the adhesive bead of the invention onto a transfer medium if used, and/or onto the ultimate substrate to be coated. If a large amount of magnetic material is employed it can interfere with the adhesive properties of the PSA coating prepared from the beads. If a very large amount of magnetic material is included the bead will function more or less as a means for adhering a magnetic material to a substrate rather than as a means for adhering a PSA to a substrate.

The magnetic particle size can vary. Typically, each magnetic particle has a smaller diameter than the PSA cores which they surround and/or are embedded in. Typically each magnetic particle(s) has a diameter of about 1 to about 100 microns.

Methods of Drying Beads

Once the basic bead structure comprising the pressure sensitive adhesive core and the non-tacky electrically responsive shell and/or magnetically responsive core and/or magnetically responsive shell has been formed, the beads, if contained in a suspension, may be dried so as to convert the beads to an essentially moisture-free condition. By "essentially moisture-free" it is meant that the beads contain no more than about 5 % moisture. Any of a variety of conventionally used drying methods such as, for example, freeze drying, heated air flash drying, spray drying, fluidized bed drying or column drying may be employed. Spray drying is a particularly preferred technique. The beads may be filtered prior to drying using, for example, a bulk dewatering process such as a belt conveyer.

Methods of Coating Beads

Pressure-sensitive adhesive beads useful according to the method of the invention are those which are useful in any application in which pressure-sensitive adhesive would have utility. Preferably, the beads are applied to a substrate by coating them as a 100% solids system. Prior to, during, or subsequent to the application of the adhesive beads to the final substrate the beads are activated to expose the pressure-sensitive adhesive cores. The beads can be activated by a number of methods including but not limited to the application of heat, the application of pressure, or both. When the beads are in a dry, free-flowing condition the core and the coating may be regarded as non-homogeneous in the sense that the core and the coating are not blended with each other at room temperature (about 20°–22° C.). However, upon the application of heat and/or pressure, the adhesive cores melt or cold flow thus becoming exposed and form a blended adhesive coating. An example of simultaneous heat and pressure activation is the passing of a bead coated substrate between a pair of heated nip rollers or the like.

Conventional pressure sensitive adhesives of 100% solids formulations are packaged in drums, pails or cartons. Because of the inherently tacky nature of the adhesives, release liners or special unloaders must be employed to evacuate the adhesive from its packaging. Adhesive beads useful according to the invention function as a conventional pressure sensitive adhesive subsequent to activation but prior to activation are free from these packaging disabilities due to the free-flowing nature of the beads.

The beads may be coated by any means employing electrostatic charges (such as triboelectric charges), magnetics, or a combination thereof. Electrostatic charges can be applied to the bead via conduction, corona treatment, photoconduction charging, and the like. Triboelectric charges are defined as charges which are imparted to the surface of the bead by friction. This may be accomplished by a mechanical process such as tumbling, brushing, air conveyance, or the like. One of the unique features of the electrostatically chagerable beads described are their ability to accept either a positive or negative charge. This is accomplished by the method of charging and the electron donating or electron withdrawing ability of the shell polymer or copolymer. This capability allows the broadest possible coating methods to be employed, independent of the charge required. The triboelectric series can be consulted to determine which of two substances would become negatively charged and which would be positively charged when the two are rubbed together. The triboelectric properties of certain polymers in descending order of electron donorship from positive (donor) to negative (acceptor) are as follows: nylon 6,6 (also wool, silk), cellulose, cellulose acetate, polymethyl methacrylate, polyacrylonitrile, polyvinyl chloride, polybisphenol carbonate, polychloroether, polyvinylidene chloride, poly-2,6-dimethyl polyphenylene oxide, polystyrene, polyethylene, polypropene, and polytetrafluorothylene. The role played by the tribolelectric series is that, it allows prediction of the polarity and level of charge obtainable.

The beads useful according to the invention may be applied to a substrate via a number of electrostatic processes such as electrostatographic processes (electrographic, electrophotographic, combinations thereof, etc.)

An electrostatic charge opposite to that applied to the beads may be applied to the substrate. and also to a transfer medium, if used, by a number of methods including but not limited to the following: brushing, conduction, corona treatment, and photoconduction.

A repulsive electrical field may be generated which can aid in positioning the charged beads on the transfer medium, if used, and also on the substrate. The repulsive electrical field(s) can be generated by a number of methods including but not limited to the following: brushing, conduction, corona treatment, and photoconduction. The repulsive field is of sufficient magnitude and positioned such that a charged bead placed therein will be transported to the transfer medium, if used, and/or depending upon the method of application transported to the substrate.

When the pressure-sensitive adhesive beads are electrostatically chargeable the pressure-sensitive adhesive bead(s) may be positioned on a substrate by attracting and contacting the bead(s) to the substrate by means of an electrostatic force.

The electrostatic force may be applied by a wide variety of methods. Included herein are several specific examples, of the use of electrostatic forces to apply beads to a substrate. However, this invention is not limited to these specific examples.

As one example, an electrostatic charge may be applied on the substrate opposite to an electrostatic charge generated on the pressure-sensitive adhesive beads. The charged pressure-sensitive adhesive beads are brought close to the charged substrate so that the beads are attracted to and contact the substrate and form a tack-free coating on the substrate due to the electrostatic attraction. Alternatively, an electrical field encompassing the substrate may be generated and an electrostatic charge applied to the pressure-sensitive adhesive beads. The electrical field which, in this example, is repulsive to the charged pressure-sensitive beads is of sufficient strength and is positioned such that it is capable of positioning the charged beads placed therein on the substrate. The charged pressure-sensitive adhesive beads are brought into the field so that the pressure-sensitive adhesive beads contact the substrate and form a tack-free coating on the substrate. Combinations of two or more methods may also be employed.

When each of the pressure-sensitive adhesive beads is magnetically responsive the beads may be attracted to and contacted with the substrate by means of one or more magnetic forces thereby positioning the pressure-sensitive adhesive beads on the substrate to form a tack-free coating of the pressure-sensitive adhesive beads thereon.

The magnetically responsive beads of the invention may be applied to a substrate via a magnetic process such as a magnetographic process. A magnetic field may be generated around the transfer medium, if used, and/or around the substrate depending on the nature of the beads and the nature of application desired. The magnetic field can be generated, for example, by a permanent magnetic and/or by an electrically induced magnetic field.

Included herein are several specific examples of the use of magnetic forces to apply beads to a substrate. However, the invention is not limited to these specific example.

As one example, when the magnetically responsive pressure-sensitive adhesive beads comprise permanent magnetic particle(s) the magnetic attraction force can be provided by a magnetically responsive material in the substrate (i.e., the substrate can comprise a magnetically responsive material) or a magnetically responsive material can be positioned on a side of the substrate opposite the pressure-sensitive adhesive beads. The pressure-sensitive adhesive beads are brought close to the substrate thereby allowing the magnetic force to position the pressure-sensitive adhesive beads on the substrate to form a tack-free coating thereon. As another example, when the magnetically responsive pressure-sensitive adhesive beads do not comprise permanent magnetic particles a magnetic attraction force may be provided by a magnetic field encompassing the substrate. The pressure-sensitive adhesive beads within the magnetic field are thereby positioned on the substrate to form a tack-free coating thereon. Combinations of methods may also be employed.

Regardless of the method of application the beads can be activated by a number of methods including but not limited to the application of heat, pressure, or both heat and pressure to provide a coating of PSA on the substrate.

When a transfer medium is used, the adhesive beads may be activated prior to transfer to a second substrate, subsequent to transfer to a second substrate, or simultaneously with transfer to the second substrate. Thus, in one situation, the pressure-sensitive adhesive beads on the transfer medium may be activated to provide a coating of pressure-sensitive adhesive on the transfer medium. The pressure-sensitive adhesive is then transferred to a second substrate to provide a coating of pressure-sensitive adhesive on the second substrate. In another situation, the pressure-sensitive adhesive beads may be transferred to a second substrate by a means selected from the group consisting of magnetic means, electrostatic means, and both magnetic means and electrostatic means and simultaneously activated, thus exposing the cores of the pressure-sensitive adhesive beads to form a coating of pressure-sensitive adhesive on the second substrate. In still another situation, the pressure-sensitive adhesive beads may be transferred to a second substrate by a means selected from the group consisting of magnetic means, electrostatic means, and both magnetic means and electrostatic means, following which the beads are subsequently activated thereby exposing the pressure-sensitive adhesive beads to form a coating of pressure-sensitive adhesive on the second substrate.

This may be done by a variety of methods. For example, an electrical field repulsive to the beads may be generated such that it encompasses the transfer medium. The electrical field is positioned and is of sufficient strength to position the charged beads placed in the electrical field on the transfer medium. Optionally, a charge opposite to that on the beads can be placed on the transfer medium. Alternatively, the transfer medium can be charged and placed in the above-mentioned electrical field. The beads are then brought close to the transfer medium and/or the optional charge on the transfer medium and/or within the optional fields encompassing the transfer medium in order to transfer the beads onto the transfer medium forming a tack-free coating thereon. The beads can subsequently be activated on the transfer medium.

As another example, a second substrate, which has been optionally charged with an electrostatic charge opposite to that on the beads, can be brought into contact with unactivated beads on the transfer medium, and simultaneous activation of the beads can occur (by the application of heat, pressure, or both heat and pressure, for example) so as to expose the pressure-sensitive adhesive core and form a coating of a pressure-sensitive adhesive on the second substrate.

As another example, a second substrate which has been optionally charged with an electrostatic charge opposite to that on the beads can be brought close to the beads on the transfer medium. The beads can then be allowed or caused to contact the second substrate and form a tack-free coating on the second substrate by various methods depending on the force holding the beads to the transfer medium. This may involve one or more of the following: removing the optional charge from the transfer medium; removing the repulsive electrical field keeping the beads in contact with the transfer medium; applying an electrical force repulsive to the beads on a side of the transfer medium opposite the beads; providing the second substrate with an electrostatic charge greater than that that has optionally been applied to the transfer medium. The beads can subsequently be activated after transfer to the second substrate so as to expose the pressure-sensitive adhesive core and form a coating of a pressure-sensitive adhesive on the second substrate.

In one situation, when magnetics are involved in holding the beads to the substrate, one can bring a second substrate, which optionally has encompassing therearound a magnetic field, into contact with the beads on the transfer medium, simultaneously activating the beads so as to expose the pressure-sensitive adhesive core and provide a layer of a pressure-sensitive adhesive on the second substrate.

In another situation when magnetics are involved, one can bring a second substrate, which optionally has encompassing therearound a magnetic field of greater magnitude than that around the transfer medium, close to the beads on the transfer medium, so that the beads contact the second substrate due to the stronger magnetic forces. This results in a tack-free coating of the beads on the second substrate. This can be followed by the subsequent step of activating the beads so as to expose the pressure-sensitive adhsive core and provide a coating of a pressure-sensitive adhesive on the second substrate.

Examples of transfer media for electrostatic processes include but are not limited to those materials that will induce an electrical charge and hold the charge for a working period (insulators). Examples thereof include but are not limited to those materials selected from the group consisting of thermoplastics, wood, paper, impregnated cloth such as epoxy siliconized cloth, rubberized cloth, etc. Useful transfer media for magnetic processes include but are not limited to those that allow the passage of a magnetic field therethrough or those that may be magnetized themselves. The transfer medium can take the form of a thin metallic film, drum, roll, metallized film, cloth, metallized cloth, etc.

Combinations of electrostatics and magnetics can also be employed according to the invention. Included herein are several specific examples. However, the invention is not limited to these specific examples. Such a method may, for example involve providing a pressure-sensitive adhesive beads, wherein the beads are electrostatically chargeable, magnetically responsive, or a combination thereof. An electrostatic charge may optionally be generated on the beads. At least one of the following may be generated: an electrostatic charge on a transfer medium opposite to the charge on the beads; an electrical field, repulsive to the beads, encompassing the transfer medium wherein the electrical field is capable of positioning the beads placed within the electrical field on the transfer medium; a magnetic field encompassing the transfer medium. This preceeding step is optional when the beads contain permanent magnetic particles and when the transfer medium is magnetically responsive or when the beads contain permanent magnetic particles, the transfer medium is non-magnetically responsive, and a magnetically responsive material is positioned on a side of the non-magnetically responsive transfer medium opposite the beads.

The beads are brought close to the transfer medium and/or the optional charge on the transfer medium and/or within the optional field(s) encompassing the transfer medium so that the beads contact the transfer medium and form a tack-free coating on the transfer medium. The beads may be activated so as to expose the pressure-sensitive adhesive core and provide a coating of a pressure-sensitive adhesive on the transfer medium. The pressure-sensitive adhesive can then be transferred to a second substrate to provide a coating of pressure-sensitive adhesive on the second substrate.

Alternatively, one can bring a second substrate, which has been optionally charged with an electrostatic charge opposite to that on the beads and/or which optionally has encompassing therearound a magnetic field into contact with the beads on the transfer medium, simultaneously activating the beads so as to expose the pressure-sensitive adhesive core and provide a coating of a pressure-sensitive adhesive on the second substrate.

Alternatively, one can transfer the beads from the transfer medium to a second substrate and then subsequently activate the beads. One or more of the following transfer methods can be used. One can bring a second substrate which has been optionally charged with an electrostatic charge opposite to that on the beads, wherein the optional charge on the substrate is optionally of greater magnitude than the charge that has been optionally applied to the transfer medium close to the beads on the transfer medium. One can bring a second substrate which optionally has encompassing therearound a magnetic field of greater magnitude than that around the transfer medium close to the bead(s) on the transfer medium. The beads are caused or allowed to contact the substrate and form a tack-free coating on the substrate by one or more of the following: by an optional electrostatic charge on the second substrate; by an optional magnetic field encompassing the second substrate; by removing the optional charge from the transfer medium; by removing the repulsive electrical field holding the beads to the transfer medium; by applying an electrical force repulsive to the beads on a side of the transfer medium the transfer medium opposite the beads; by providing the second substrate with an electrostatic charge greater than that has optionally been applied to the transfer medium. Subsequent to transfer to the second substrate the beads are activated to expose the pressure-sensitive adhesive core and provide a coating of a pressure-sensitive adhesive on the substrate.

The PSA formed upon the activation of the beads of invention can be coated on a wide variety of substrates. Examples of substrates on which the beads of the invention or the adhesive prepared therefrom can be coated include but are not limited to those selected from the group consisting of paper, thermoplastic films, metal, cloth, wood, fiberglass, leather, glass, porous membranes, circuit boards.

The following is an example of a specific transfer process. A transfer medium is charged to a negative polarity via corona charging. The transfer medium is capable of retaining the charge on its surface for a working period. Subsequently, positively charged pressure-sensitive adhesive beads are brushed across the transfer medium surface and are attracted to the negatively charged areas. The greater the amount of negative charge in each area of the transfer medium the greater the amount of pressure-sensitive adhesive beads attracted thereto. The substrate is brought close to the transfer medium. A negative charge greater than that on the transfer medium is laid down on the surface of the substrate to attract the positive adhesive beads to the substrate from the transfer medium. The substrate is then carried to a heated nip roller which contacts the pressure-sensitive adhesive beads and activates them on the substrate surface, thus forming a tacky adhesive surface. Excess beads are vacuumed or blown clear.

The substrate may optionally be coated with a primer material prior to coating with the unactivated beads of the invention or subsequent to coating with the unactivated beads. The beads can be secured to the substrate simultaneously with positioning on the substrate or subsequent to positioning on the substrate. The beads, which are secured to the substrate, may then be activated at a later point in time prior to use. Primer materials are those defined as having the ability to maintain the PSA beads in position for a sufficient period of time to allow post activation. Examples thereof include but are not limited to those selected from the group consisting of inks, shellacs, varnishes, adhesives, low melt temperature (co)polymers, polyolefins, and waxes, such as paraffin and beeswax.

Another method of application of PSA beads to a substrate involves the use of a positioning particle(s). The positioning particle is a particle which is both magnetically responsive and electrostatically chargeable. Preferably, the positioning particle comprises a magnetically responsive particle having an electrostatically chargeable coating. Alternatively, the positioning particle comprises a magnetically responsive material which is also electrostatically chargeable. The positioning particles can be used as a template or positioning aid to position pressure-sensitive adhesive beads on a substrate. The same electrostatically chargeable materials which can form the shell of the PSA beads can also be used to coat magnetically responsive particles to form one type of positioning particle. The same magnetically responsive materials which can be included in the PSA beads can also be used in forming the positioning particles. The diameter of the positioning particle can vary according to use.

The method of application involves providing a first substrate and a positioning particle(s). The positioning particles are positioned on a first substrate by a means selected from the group consisting of electrostatic force(s), magnetic force(s), both electrostatic and magnetic forces to form a coating of the positioning particles on a first substrate. A pressure-sensitive adhesive bead(s) is provided which is electrostatically chargeable, magnetically responsive, or both. The adhesive beads are then positioned on the positioning particle-coated substrate by attraction and contacting the positioning particles and pressure-sensitive adhesive beads by a means selected from the group consisting of magnetic force(s), electrostatic force(s), both magnetic force(s) and electrostatic force(s) by bringing the bead(s) close to the particles on the substrate. The beads can be activated on the substrate. Alternatively, the beads can be removed and positioned on a second substrate by appropriate magnetic and/or electrostatic forces which do not remove the positioning particles themselves.

According to one specific positioning method, the pressure-sensitive adhesive beads need not be magnetically responsive themselves as long as the shell material is electrostatically chargeable. The particles can be positioned on the substrate by means of a magnetic force(s). As one example, when the positioning particle comprises a permanent magnetic particle the magnetic attraction force can be provided by a magnetically responsive material in the substrate or on a side of the substrate opposite the positioning particles. The positioning particles are brought close to the beads on the substrate thereby allowing the magnetic force(s) to position the positioning particles on the substrate to form a tack-free coating thereon. As another example, when the positioning particle does not comprise a permanent magnetic particle a magnetic attraction force may be provided by a magnetic field encompassing the substrate. The positioning particles within the magnetic field are thereby positioned on the substrate to form a tack-free coating thereon. Combinations of methods may also be employed. The magnetic force such as a magnetic field may be used to control the coating pattern. The positioning particles can be placed close to or in the magnetic field encompassing the substrate, wherein they contact the substrate in the desired pattern established due to the magnetic field. The electrostatically chargeable shell material on the PSA bead can be identical to an electrostatically chargeable coating on the positioning particle. Preferably, the positioning particle has an electron-donating coating and the pressure-sensitive adhesive bead has an electron-accepting shell material. Alternatively, the positioning particle preferably has an electron-accepting coating and the pressure-sensitive adhesive bead has an electron-donating shell. This can be accomplished by selecting a different electrostatically chargeable material for the PSA beads and for the positioning particles. A charge can be generated on the electrostatically chargeable PSA bead, on the positioning particles, or both. The ensuing electrostatically attractive force between the PSA beads and positioning particles results in the positioning of the pressure-sensitive adhesive beads on the particle coated substrate.

According to this specific example, the electrostatically chargeable shell material of the pressure-sensitive adhesive bead(s) is attracted to and contacts the electrostatically chargeable coating of the positioning particle which is being secured to the substrate by magnetic forces. The electrostatically chargeable shell material of the adhesive beads thus contacts the electrostatically chargeable coating of the positioning particles resulting in a coating of the adhesive bead(s) on the substrate. The beads can thereafter be activated on the substrate to form a coating of PSA on the substrate. Alternatively, the beads can be removed by electrostatic forces. For example, a second substrate upon which an electrostatic charge of greater magnitude has been generated which is attractive to the beads but not the positioning particles can be brought close enough to the bead and positioning particle-coated first substrate to attract the PSA beads and remove them via electrostatic forces. The beads can then be subsequently activated on the second substrate.

Test Methods

Pourability of Beads—Funnel Discharge Time Test

Once dried, the pressure-sensitive adhesive beads according to the invention are non-agglomerating, essentially cluster-free and free-flowing. These terms are used interchangeably and are defined with reference to a modified American Society of Testing and Materials (ASTM) D-1895-69 with a funnel discharge time of less than 1 minute. More particularly, a static free funnel having a volume of about 100 milliliters and a discharge spout diameter of about 12.7 millimeters (ram) is employed. The discharge spout is temporarily closed by placing a static free object such as a wood tongue depressor against the distal end thereof and approximately 20 grams (g) of adhesive beads are lightly poured into the funnel so as to avoid any packing thereof. The flat strip of wood is removed and the elapsed time before the last bead discharges from the funnel is recorded in seconds as the funnel discharge time.

This test method recognizes that small clusters or clumps of beads are permissible within the scope of the invention so long as the clusters or clumps do not impede movement of the beads through the funnel to the extent that the funnel discharge time exceeds 1 minute. The shell coating renders the beads non-tacky to the touch and contributes to their free-flowing nature.

Peel Adhesion

The pressure-sensitive adhesive beads of Examples 2, 3, 5, and 11 were each separately tested for adhesion according to the following procedure. Standard, 20 pound (9.1 kg) bond white copier paper was coated with an orange printing ink (Sinclair and Valentine #88318, St. Paul, Minn.) at a weight of 5.37 g/m² using a 2.5 inch (6.35 cm) rubber roller. The ink facilitated positioning and visualization of the subsequently applied beads while maintaining the beads on the paper during post treatment. While the ink was still slightly wet, it was dusted with the previously dried, free-flowing adhesive beads. Excess adhesive beads were lightly shaken from the paper so as to provide a monolayer coating of beads thereon (approximately 139 g/m²). The adhesive bead coated paper was air dried and cut into four equally sized samples. The adhesive coatings were then heat activated with a 4"×3" (20 cm×7.6 cm), 2 kilogram heated plate assembly by exposing the coated paper samples to a temperature of 149° C. under a constant pressure of 25.8 g/cm² for various times ("Dwell Time") as indicated in Table 2.

Peel adhesion of the pressure-sensitive adhesive beads to polyester film was determined according to a modified version of American Society of Testing and Materials (ASTM) P3330-78, Method C. More particularly, a strip of double faced adhesive tape (Scotch™ brand No. 410 double coated paper tape commercially available from 3M, St. Paul, Minn.) was applied to the steel panel of a 90 Degree Peel Jig (Chemsultants, Mentos, Ohio). The adhesive coated paper samples were applied to the double faced tape with the adhesive bearing surface of the paper substrate facing outwardly. A 1.25 inch (3.2 cm) by 0.9 mil (0.2 mm) polyester film was applied to the adhesive coated surface of the paper with two passes of a roller. One end of the polyester film was placed in the upper jaw of the adhesion tester and was pulled at a 90° angle relative to the steel plate and at the rate specified in the ASTM test method (30.5 cm/min). The peel adhesion value in grams per centimeter of width (g/cm width) is reported as the average of two samples.

Determination of Charge per Unit Area

The following is the test procedure used to determine the charge on the surface of the free flowing pressure-sensitive adhesive beads of the invention.

Procedure:

1) Prepare a test plate using a 102×102 mm by 4.7 mm thick glass plate coated with a thickness of less than 0.005 mm of an acrylate copolymer adhesive as described in U.S. Pat. No. Re 24,906, assigned to 3M Company, St. Paul, Minn., incorporated by reference herein (a 95.5:4.5 iso-octyl acrylate:acrylic acid copolymer of 1.5% solids in heptane), the purpose of which is to allow positioning of the adhesive beads to be tested without their activation. The glass plate constructions were tested to determine the average dielectric constant at 100 Hz for use in calculations of charge density. This was accomplished following specifications outlined in ASTM D-150, titled A-C Loss Characteristics and Permittivity (Dielectric Constant) of Solid Electrical Insulating Materials, incorporated by reference herein, using under sized lead foil electrodes with brass dead weights, with a Hewlett Packard, (San Diego, Calif.) model #4284A, Induction, Capacitance, Resistance Meter, and measuring the dielectric constant at 100 Hz, 1 KHz, 10 KHz, 100 KHz, and 1 MHz.

2) Mask off a 2 cm×2 cm square area in the center of the plate on the adhesive coated side using a TEFLON™ template (available from E. I. dupont de Nemours & Co.).

3) Grade the beads according to size using 425 and 500 micrometer opening sieves, and collect the beads retained in the 425 micrometers sieve. This gives a bead distribution of $425\mu \leq X \leq 500\mu$ or $0.0165$ in.$\leq X \leq 0.0197$ in. Charge 2 g of beads by placini the beads in a 100×15 mm polystyrene petri dish with a non-conductive fiber board cover and shaking vigorously by hand for 30 seconds.

4) Quickly apply to the pre-masked area of the glass plate a monolayer of the charged beads. Apply a TEFLON™ release sheet (available from E. I. dupont de Nemours & Co.) and roll once using a 63.5 mm rubber roller to tack the beads to the adhesive surface.

5) Using a Monroe Electronics, Inc., Lyndonville, N.Y., model #244 miniature non-contact electrostatic voltmeter and a model #1015B probe, place the sample on the surface of a ground plate and adjust to a 1 mm gap between the surface of the beads and the probe end.

6) Slowly move the sample under the probe until the total surface area has been sampled.

7) Record the voltage every 6 seconds.

8) Calculate the mean voltage over the 2×2 cm area.

9) Record the relative humidity and temperature during testing.

10) Calculate static charge density and static charge per bead based upon average static volts and average bead diameter using the formulas below.

Static Charge Density=$\sigma = \epsilon V/4\pi r d$

Static Charge/Bead=$\sigma/\eta$

Particle Density/Unit Area=$\eta = 1$ cm²/4r²

$\epsilon$ =Dielectric Constant of the Adhesive Coated Glass Plate d=Total Thickness of Plate in cm with Beads Coated Thereon esV=Recorded Mean Static Volts r=Average Radius of Beads in cm 1 Static Volt=300 Volts 1 Static Coulomb=$3 \times 10^{-9}$ Coulombs Results are reported in Table 1 wherein the average PSA bead diameter was 462.5μ.

Static Voltage v. Time

The following is the test procedure used to determine the static voltage versus time for the free-flowing pressure-sensitive adhesive beads of the invention.

(1) Charge 2 g of beads by placing the beads in a 100×15 mm polystyrene petri dish with a nonconductive fiber board cover, shake vigorously by hand for 30 seconds.

(2) Quickly apply a monolayer of the beads to a standard ASTM 16 gauge stainless steel test plate.

(3) Using a Monroe, Electronics Inc., Lyndonville, N.Y., Model #244 miniature noncontact electrostatic voltmeter and a Model #1015B probe, place the bead coated test plate on the surface of a ground plate and adjust to a 1 mm gap between the surface of beads and the probe end.

(4) Record the voltage every 15 seconds. Testing was conducted at 23.9° C. and 20% Relative Humidity.

EXAMPLES

The invention will be more fully appreciated with reference to the following non-limiting examples. All parts, percentages, ratios, etc., in the Examples and the rest of the Specification are by weight unless indicated otherwise.

The following abbreviations and tradenames are used herein.

| Abbreviation | Material |
| --- | --- |
| AA | Acrylic acid |
| ACM | Acrylamide |
| $CBr_4$ | Carbon tetrabromide |
| IOA | Isooctyl acrylate |
| IOTG | Isooctyl thioglycolate |
| IPA | Isopropyl alcohol |
| $K_2S_2O_8$ | Potassium persulfate |
| LiOH | Lithium hydroxide |
| MAA | Methacrylic acid |
| MMA | Methyl methacrylate |
| $NaHSO_3$ | Sodium bisulfite |
| NaLS | Sodium lauryl sulfate |
| $NH_4OH$ | Ammonium hydroxide |
| NVP | N-vinyl-2-pyrrolidone |
| PMMA | Poly(methyl methacrylate) |
| PNVP | Poly(N-vinyl-2-pyrrolidone) |
| PS | Polystyrene |
| S | Styrene |
| SSS | Sodium styrene sulfonate |
| THF | Tetrahydrofuran |
| VAZO ™ 64* | 2,2'-azobis(isobutyronitrile) |
| VOAc | Vinyl acetate |
| ZnO | Zinc oxide |
| % R.H. | percent relative humidity |
| Temp. | temperature |
| Ex. | Example |
| Sec. | seconds |

*Commercially available under this tradename from E. I. duPont de Nemours & Co., Wilmington, Delaware.

Preparation of Pressure-Sensitive Adhesive Cores "A"

The following describes the preparation of pressure-sensitive adhesive cores "A" based on acrylic acid esters and using an aqueous suspension polymerization technique. The reaction was carried out in a five liter split flask equipped with a condenser, a motor driven stainless steel stirrer having a speed control, a thermowell, a nitrogen gas inlet, and heating lamps with a temperature control. A dispersion of 7.8 g of ZnO and 1.56 g of PNVP in 1820 g of deionized water was added to the flask, the temperature was maintained at 58° C., and the agitator (stirrer) was set at 375 revolutions per minute (rpm). A degassed monomer premix comprising 5.2 g of MMA, 260 g of VOAc, 64.5 g of MAA, 1232.4 g of IOA, 0.8324 g of IOTG, and 7.8 g of VAZO™64 2,2'-azobis(isobutyronitrile) was then added to the flask, followed by 3.9 g of $NH_4OH$. An exotherm was observed during which time the temperature was maintained at about 68° C. with an ice-water bath. After 1.5 hours, the temperature was reduced to 65° C. and the agitation increased to 425 rpm. After 5.5 hours the temperature was decreased to 50° C. and 3.12 g of LiOH in 40 milliliters (ml) of deionized water was added to the reaction flask. Agitation at 425 rpm was continued for 0.5 hour. The resulting copolymer pressure-sensitive adhesive cores were dewatered and isolated at 70% solids by gravity filtration. Upon subsequent drying, the pressure-sensitive adhesive cores were inherently tacky and were not free flowing as defined by the Funnel Discharge Time Test (ASTM D-1895-69) described above.

Example 1

Example 1 illustrates the formation of adhesive beads comprising a pressure sensitive adhesive core surrounded by an essentially discontinuous inorganic powder coating. More particularly, a dispersion comprising 450 g of the filtered adhesive cores "A" and 450 g of deionized water was mixed with 12.6 g of AEROSIL® R972 hydrophobic fumed silica (commercially available from Degussa Corp., Ridgefield Park, N.J.) dispersed in 27 g of IPA. The resulting mixture was heated at 65° C. with agitation for 30 minutes. The resulting beads were filtered and dried with constant agitation in a fume hood under ambient conditions. The resulting beads were free-flowing and had a moisture content of less than 1%. Charge per unit area was calculated and is set forth in Table 1. Peel adhesion and pourability was calculated and is set forth in Table 2. Static voltage versus time for the beads is shown in FIG. 1.

Example 2

Example 2 describes the formation of adhesive beads comprising pressure-sensitive adhesive cores "A" surrounded by a continuous urea formaldehyde shell. More particularly, a precondensate of the shell material was prepared by mixing 48 g of urea and 12 1 g of 37% aqueous formalin and a sufficient amount of a 10% aqueous sodium hydroxide solution to reduce the solution pH to 8.0. The mixture was agitated at 70° C. for one hour. Upon formation of a linear formalin-urea polymer, 28 g of the precondensate were added to a dispersion comprising 403 g of the filtered pressure-sensitive adhesive cores "A" and 500 g of deionized water. A sufficient amount of 5% aqueous hydrochloric acid solution was added dropwise until the solution pH was reduced to 3.5. The resulting solution was agitated at 50° C. for about five hours. This procedure was repeated until 103 g of the precondensate had been consumed in the formation of the adhesive beads. The coated beads were then filtered and dried under ambient conditions. The resulting beads were free-flowing. Charge per unit area was calculated and is set forth in Table 1. Peel adhesion and pourability was calculated and is set forth in Table 2. Static voltage versus time for the beads is shown in FIG. 1.

Example 3

Example 3 describes a polymeric material, for forming an essentially discontinuous organic polymer coating which is provided as a granulated powder. More particularly, a reaction was carried out in a two liter split flask equipped with a condenser, a motor driven stainless steel stirrer (agitator) having a speed control, a thermowell, heating lamps with a temperature control, and a nitrogen gas inlet. An aqueous dispersion comprising 10.0 g of PNVP, 297.0 g of MMA, and 3.0 g of SSS in 1000 g of degassed, deionized water was heated to 55° C. with agitation at 250 rpm. The flask was then charged with 0.60 g of $K_2S_2O_8$ and the reaction was allowed to proceed for 4 hours at 55° C. The reaction mixture was then cooled to room temperature (about 20°–22° C.) at which time a trace amount (about 0.01 g) of hydroquinone was added to remove any residual initiator. The reaction provided an organic polymer latex to produce a polymeric material comprising 99 parts MMA and 1 part SSS. More specifically, the organic polymer latex was dried in an oven maintained at 65° C. for 15 hours and subsequently pulverized so as to form a dry, granular powder having an average particle size of less than about 1 micron in diameter. The polymeric material was subsequently used to form an essentially discontinuous organic polymer shell about the adhesive cores "A".

12.6 g of the powder were combined with 450 g of the filtered pressure-sensitive adhesive cores "A" and 450 g of deionized water in a two liter reaction flask. The mixture was heated to 65° C. with agitation and maintained at this temperature for approximately 30 minutes. The adhesive beads were filtered and dried with constant agitation under ambient conditions. The resulting beads were free-flowing. The beads had an essentially discontinuous organic polymer coating comprising 99 parts MMA and 1 part SSS. The beads had a moisture content of less than 1%. Static voltage versus time for the beads is shown in FIG. 1.

Example 4

Example 4 describes adhesive beads with a substantially continuous thermoplastic shell coating. More particularly, a reaction was carried out in a two liter split flask equipped with a condenser, a motor driven stainless steel stirrer (agitator) having a speed control, a thermowell, heating lamps with a temperature control, and a helium gas inlet. A suspension was prepared from 343 g of adhesive cores "A", in 200 ml of deionized water containing 2 drops of AEROSOL® MA-80 (sodium dihexyl sulfosuccinate surfactant) commercially available from American Cyanamid Co., Wayne, N.J.) and 2 drops of POLYWET® Z-1766 (bisulfite terminated sodium salt of polyacrylic acid commercially available from Uniroyal Chemical Co., Middlebury, Conn.). A redox initiator consisting of 0.1888 g of potassium persulfate and 0.020 g of sodium bisulfite was added to the suspension and the mixture heated to 70° C. under helium and constant agitation at 350 rpm. MMA monomer was carefully added by syringe pump according to the following schedule: 5 g at 5.1 ml/hr; 30 g at 8.4 ml/hr; and a final 10 g at 20 ml/hr by use of a dropping funnel. After 5 hr, the mixture was heated to 80° C. and another 15 g of MMA monomer was added at 20 ml/hr also by dropping funnel. The adhesive beads were filtered and dried under ambient conditions resulting in a free-flowing bead form with a moisture content of less than 1%. Photomicrographs of the beads showed a mainly continuous shell coating which was free of discrete particles. Charge per unit area was calculated and is set forth in Table 1. Peel adhesion and pourability was calculated and is set forth in Table 2. Static voltage versus time for the beads is shown in FIG. 1.

Example 5

Example 5 describes the preparation of magnetically responsive adhesive beads. The reaction was carried out in a two liter split flask equipped with a condenser, a motor driven stainless steel stirrer (agitator) having a speed control, a thermowell, heating lamps with a temperature control, and a nitrogen gas inlet. Prior to the reaction, PMMA homopolymer was produced following the procedure of Example 4 with the exception of 300 g of MMA being used with no SSS. The PMMA emulsion was then dried in a 65.6° C. oven and ground by mortar and pestle to produced a powder. The molecular weight as determined by gel permeation chromatography was an average molecular weight of 687,000 and a polydispersity of 3.0. The PMMA homopolymer powder was then dispersed in methyl ethyl ketone at 10% by weight dry powder. To 50 g of 10% PMMA homopolymer dispersion was added nickel powder (commercially available from Inco Alloys International, Inc., Huntington, W. Va.) in the amount of 50 g, with a mean particle size of 50.45 microns (as determined by Leads and Northrup, Microtrac, Full Range Analyzer, North Whales, Pa.). The combined dispersion of PMMA and nickel was then dried in a 65.6° C. oven for 2 hours and ground by mortar and pestle. The powder was sieved to under 53 microns and then used in the following reaction. A dispersion of 1.5 g of ZnO and 0.30 g of PNVP in 350 g of deionized water was added to the reactor and the batch temperature was set to 58° C. with agitation at 375 rpm. A degassed monomer premix consisting of 1.0 g of MMA, 50 g of VOAc, 12.3 g of MAA, 237 g of IOA, 0.1809 g of IOTG and 1.5 g of VAZO™ 64 2,2',azobis(isobutyronitrile) was then added. After 1.5 hr., the batch temperature was reset to 65° C. and the agitation increased to 425 rpm. After 5.5 hr., the batch temperature was reset to 50° C. 6.4 g of coated nickel powder and 6.4 g of micronized polyethylene were added. Agitation at 425 rpm was continued for 0.5 hr. The coated beads were then filtered off and dried with constant agitation in a fume hood under ambient conditions to give free-flowing beads with a moisture content of less than 1%. Charge per unit area was calculated and is set forth in Table 1. Static voltage versus time for the beads is shown in FIG. 1.

Example 6

This example describes the preparation of adhesive beads using a tackified rubber based adhesive system. More particularly, 128.9 g of CA-501 rubber based adhesive (available from Century Adhesives Corp., Columbus, Ohio) and 5.16 g of powdered homopolymer PMMA from Example 5 were combined and frozen using liquid nitrogen. The frozen material was then ground by mortar and pestle to create particles of PMMA coated adhesive. The resulting material was then sieved to under 780 microns for further testing. Charge per unit area was calculated and is set forth in Table 1. Static voltage versus time for the beads is shown in FIG. 1.

TABLE 1

| | Determination of Charge per Unit Area | | | | | |
|---|---|---|---|---|---|---|
| Example | Ex. 1 | Ex. 2 | Ex. 3 | Ex. 4 | Ex. 5 | Ex. 6 |
| Avg. esV | −86.52 | 81.49 | −71.17 | −94.13 | −46.91 | 276.33 |
| Static Charge per Bead (esC/Bead) | −0.2357 | 0.2219 | −0.1939 | −0.2564 | −0.1278 | 0.7527 |
| Static Charge Density (esC/cm$^2$) | −110.18 | 103.78 | −90.63 | −119.87 | −59.74 | 351.90 |
| Temp. | 22.8° C. | 22.8° C. | 22.8° C. | 22.8° C. | 22.8° C. | 22.2° C. |
| % R.H. | 20% | 20% | 20% | 20% | 20% | 20% |

Example 7

This example describes the preparation of adhesive beads according to the invention wherein the coating is provided by a latex dispersion of the polymer additive that is added to the adhesive cores shortly after the observation of the exotherm which occurs during the aqueous suspension polymerization of the cores.

More particularly, the reaction was carried out in a two liter split flask equipped with a condenser, a motor driven stainless steel stirrer (agitator) having a speed control, a thermowell, heating lamps with a temperature control, and a nitrogen gas inlet. A dispersion of 1.5 g of ZnO and 0.3 g of PNVP in 350 g of deionized water was added to the flask and the temperature was maintained at 58° C. with agitation at 375 rpm. A degassed monomer premix for forming the cores comprising 1.0 g of MMA, 50 g of VOAc, 12.4 g of MAA, 237 g of IOA, 0.1606 g of IOTG, and 1.5 g of VAZO™64 2,2'-azobis(isobutyronitrile) was added, followed by 0.75 g of NH$_4$OH. After the exotherm was observed (about 1 hour after the start of the reaction), 53.2 g of the organic polymer latex of Example 3 was added. After 1.5 hours, the temperature was increased to 65° C. with constant agitation at 375 rpm. After 5.0 hours, the temperature was decreased to 50° C., and 0.16 g of LiOH in 10 ml of deionized water was added to the reaction mixture. Agitation at 375 rpm was continued for 0.5 hour.

The adhesive beads were filtered and dried under constant agitation at ambient conditions to give free-flowing beads with a moisture content of less than 1%. The resulting beads were free-flowing. The beads comprised a pressure sensitive adhesive core surrounded by an essentially discontinuous organic copolymer coating comprising 99 parts MMA and 1 part SSS. Static voltage versus time for the beads is shown in FIG. 1.

Example 8

The procedure of Example 7 was repeated except that the organic polymer latex of Example 3 was combined with the monomer premix for forming the adhesive cores prior to the initiation of the suspension polymerization that formed the cores. The resulting beads comprised a pressure sensitive adhesive core surrounded by an essentially discontinuous organic polymer coating comprising 99 parts MMA and 1 part SSS. The adhesive beads were filtered and dried under constant agitation at ambient conditions to give free-flowing beads with a moisture content of less than 1%. The resulting beads were free-flowing. This example demonstrates that adhesive beads according to the invention may be formed using an "in-line" process. Static voltage versus time for the beads is shown in FIG. 1.

Example 9

An organic polymer latex was prepared using emulsion polymerization according to Example 3 except that the two liter flask was charged with 333 g of degassed and deionized water, 3.33 g of PNVP, and 100 g of MMA. Once the temperature reached 55° C., 0.202 g of K$_2$S$_2$O$_8$ and 0.145 g of NaHSO$_3$ were charged to the reaction flask and the reaction was allowed to proceed for four hours at 55° C. Analysis by gel permeation chromatography indicated that the high molecular weight PMMA homopolymer latex formed in this example had a weight average molecular weight of 806,000 and a polydispersity of 3.3.

54.8 g of the high molecular weight PMMA homopolymer latex were added to 450 g of the filtered adhesive cores "A" according to the procedure of Example 3, thereby forming adhesive beads having an essentially discontinuous organic polymer coating derived from a high molecular weight PMMA homopolymer. The adhesive beads were filtered and dried under constant agitation at ambient conditions to give free-flowing beads with a moisture content of less than 1%. The resulting beads were free-flowing. Static voltage versus time for the beads is shown in FIG. 1.

Example 10

An organic polymer latex was prepared by emulsion polymerization according to Example 3 except that the two liter flask was charged with 10 g of PNVP, 1000 g of degassed and deionized water, 300 g of MMA, and 0.1620 g of CBh. Once the temperature reached 55° C., 0.60 g of K$_2$S$_2$O$_8$ and 0.40 g of NaHSO$_3$ were added to the reaction flask and the reaction was allowed to proceed for four hours at 55° C. After four hours at 55° C., 0.05 g of hydroquinone was added to deactivate any excess initiator. Analysis by gel permeation chromatography indicated that the low molecular weight PMMA homopolymer latex formed in this example had a weight average molecular weight of 687,000 and a polydispersity of 3.0. 54.8 g of the low molecular weight PMMA homopolymer latex were added to 450 g of the filtered adhesive cores of "A" according to the procedure of Example 3 thereby forming adhesive beads having an essentially discontinuous organic polymer coating derived from a low molecular weight PMMA homopolymer. Peel adhesion and pourability was calculated and is set forth in Table 2. The adhesive beads were filtered and dried under constant agitation at ambient conditions to give free-flowing beads with a moisture content of less than 1%. The resulting beads were free-flowing. Static voltage versus time for the beads is shown in FIG. 1.

Example 11

An organic polymer latex was prepared by emulsion polymerization according to Example 3 except that the two liter flask was charged with 10.0 g of NaLS, 0.132 g of CBr$_4$, 300 g of S, and 1,000 g of degassed and deionized water. Once the temperature reached 55° C., 0.61 g of K$_2$S$_2$O$_8$ was added and the reaction was allowed to proceed at this temperature for 4.5 hours. At this time, the reaction mixture was allowed to cool to room temperature and 0.01 g of hydroquinone was added to remove any residual initiator. Analysis by gel permeation chromatography indicated that the low high molecular weight PS homopolymer latex formed in this example had a weight average molecular weight of 585,000 and a polydispersity of 2.4.

54.8 g of the low molecular weight PS homopolymer latex were added to 450 g of the filtered adhesive cores "A" as described in conjunction with Example 3, thereby forming adhesive beads which included an essentially discontinuous organic polymer coating derived from a low molecular weight PS homopolymer. The adhesive beads were filtered and dried under constant agitation at ambient conditions to give free-flowing beads with a moisture content of less than 1%. The resulting beads were free-flowing. Static voltage versus time for the beads is shown in FIG. 1.

TABLE 2

| Dwell Time | Peel Adhesion (g/cm width) | | | |
| --- | --- | --- | --- | --- |
| (Minutes) | Ex. 1 | Ex. 2 | Ex. 4 | Ex. 10 |
| 0.5 | 1.0 | 8.4 | 0.7 | 83.8 |
| 1.0 | 2.2 | 11.7 | 0.7 | 114.6 |
| 3.0 | 4.1 | 26.8 | 2.8 | 130.8 |
| 10.0 | 35.2 | 41.3 | 4.3 | 256.9 |
| Pourability (sec.) | 4.0 | 6.0 | 2.1 | 5.5 |

Example 12

To demonstrate the use of electrostatics in the coating of the pressure sensitive adhesives beads of the invention an experiment was conducted utilizing a Hipotronics Inc., Brewster, N.Y., High Voltage DC Power Supply, model No. R10B, and the corona wire cartridge from a 3M Company, St. Paul, Minn., model No. 566A6, copy machine. The surface to be coated was a 15.24 cm wide by 1 mil thick polyester film, masked off by two 5.1 cm strips of Scotch™ brand No. 811 removable Magic™ tape (commercially available from 3M Company, St. Paul, Minn.) leaving one 5.1 cm strip remaining running down the middle of the polyester film. 9000 volts dc were applied to the corona cartridge and the polyester film with a 15.24 cm wide paper carrier (20 pound, bond by Nekoosa, Ashdown, Ariz.) was pulled through the corona discharge at a rate of approximately 1.8 m per minute by hand, wherein the film and cartridge were separated by a 0.635 cm air gap. A Monroe Electronics, Inc., Lyndonville, N.Y., Model No. 244 miniature non-contact electrostatic voltmeter and a Model No. 1015B probe was used to determine the electrostatic voltage distribution over the film surface. It was determined to be 2200–2400 electrostatic volts in the non-masked areas and 530–860 electrostatic volts in the masked areas, also determined that a similar distribution of negative polarity was present on the opposite side. Several grams of the beads of each of Examples 1, 2, 4, and 5 were separately charged by placing the beads in a 100×15 mm polystyrene petri dish with a polystyrene cover, and shaking vigorously by hand for 30 seconds. A monolayer of charged adhesive beads were quickly applied to the film surface. Beads of Examples 2, 4 and 5 had high bead concentrations in the area that was masked off during corona treatment, whereas the beads of Example 1 were concentrated in the nonmasked area. For the beads of each of Examples 1, 2, 4, and 5 some scattering of beads did occur outside their respective areas. The Monroe non-contact voltmeter and a ground plate was used to determine the polarity of the beads. The Monroe non-contact voltmeter and Model No. 1015B probe was placed on the surface of a ground plate and adjusted to a 1 mm gap between the surface of the beads and the probe end. The sample was moved slowly under the probe until the total surface area had been sampled. The pressure-sensitive adhesive beads of Examples 2, 4, and 5 were positive, whereas the pressure-sensitive adhesive beads of Example 1 were negative. Thus, the coating patterns obtained from the beads of Examples 2, 4, and 5 were reversed from that obtained from the beads of Example 1.

Example 13

Figure 2:
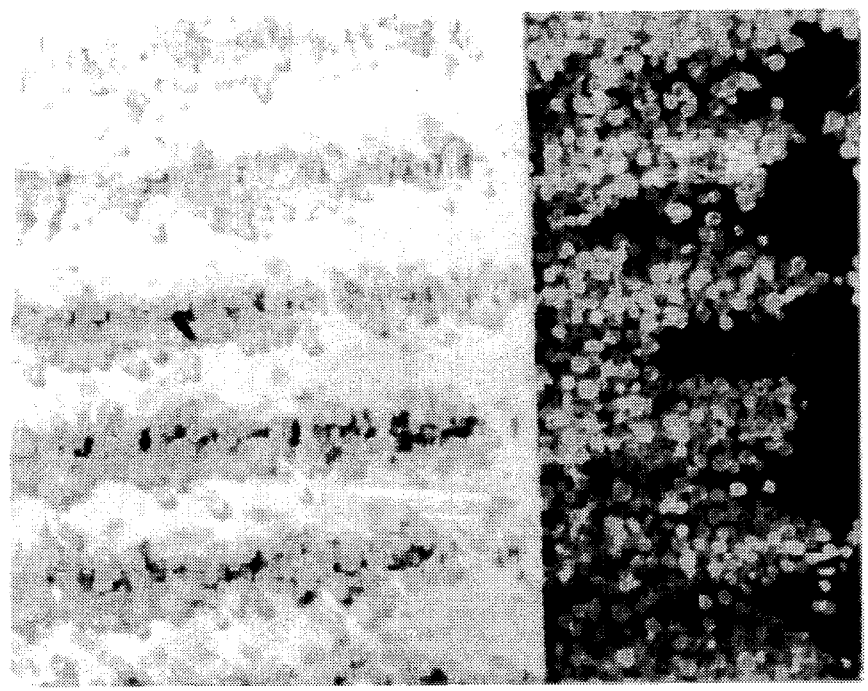
FIG. 2 illustrates the parallel alignment of the magnetically responsive beads of Example 5 on a paper/magnetic tape interface prepared according to the procedure of Example 13.

To demonstrate the use of magnetics in the coating of the pressure-sensitive adhesive beads of the invention, an experiment was conducted utilizing the magnetically responsive beads prepared according to Example 5. A 21.8× 21.6 cm piece of standard white medium bond paper was placed on top of the adhesive-free side of 0.152 cm thick, 2.54 cm wide piece of 3M™ Brand No. 1317 magnetic tape (available from 3M Company, St. Paul, Minn.) which had previously been adhered to a piece of cardboard. The length of the magnetic tape was such that the edge of the magnetic tape extended beyond the edge of the standard white bond paper. The beads of Example 5 were sprinkled onto the paper and magnetic tape at their transition point. Excess beads were wiped off to provide a monolayer of beads. The beads oriented themselves in substantially parallel lines due to the magnetic field created by the underlying magnetic tape. FIG. 2 illustrates the parallel alignment of the magnetically responsive beads of the invention at the paper magnetic tape interface, the paper constituting the light colored substrate and the magnetic tape constituting the dark colored substrate. The beads retained their pattern even when the composite was moved from a horizontal position to a vertical position and even when the composite was inverted.

Example 14

This example describes the use of non-incorporated magnetically responsive particles having an electrostatically chargeable coating (positioning particles) for the positioning of electrostatically chargeable pressure-sensitive adhesive beads. Particles of PMMA coated nickel prepared according to the procedure of Example 5 were applied according to the procedure of Example 13 to the standard white bond paper with magnetic tape underlying. The PMMA/nickel positioning particles oriented themselves in substantially parallel lines due to the underlying magnetic tape. Low molecular weight polystyrene coated adhesive beads prepared according to the procedure of Example 11 were charged to a negative voltage by placing several grams of the beads in a 100×15 mm polystyrene petri dish with a non-conductive fiber board cover and shaking vigorously by hand for 30 seconds.

The charged beads were then dusted onto the previously positioned PMMA/nickel positioning particles and the paper substrate. An induced positive charge was developed on the PMMA/nickel positioning particles causing the PSA beads to be aligned between and around the PMMA/nickel positioning particles. The resulting effect was a single stripe-coating of the PSA beads.

This enables the aligned PSA beads to be activated in place to produce a PSA coating over the PMMA/nickel stripes, or in turn, to be transferred to a second substrate by utilizing a greater static electrical charge on a second substrate than that previously induced on the PMMA/nickel positioning particles. The pressure-sensitive adhesive beads may then be separated from the positioning particles and transferred to the second substrate maintaining the pattern produced by the positioning particles. These may then be activated (by heat and/or pressure, for example) on the second substrate.

Reasonable variations and modifications of the foregoing specification are possible without departing from the scope of the invention which is defined in the accompanying claims.

What is claimed:

1. A coated substrate comprising a substrate having a layer of pressure-sensitive adhesive which displays pressure-sensitive tack coated thereon, wherein the pressure-sensitive adhesive is formed from free flowing adhesive beads wherein each adhesive bead consists essentially of a pressure-sensitive adhesive core and a tack-free shell therearound, wherein the pressure-sensitive adhesive core consists essentially of a pressure-sensitive adhesive and wherein the bead consists essentially of a magnetically responsive material and wherein the beads are capable of being applied to the substrate via magnetic forces, and wherein upon activation by heat and/or pressure the beads form a layer of pressure-sensitive adhesive that displays pressure-sensitive tack on the substrate.

2. The coated substrate of claim 1 wherein for each adhesive bead the adhesive core consists essentially of a magnetically responsive material, the tack-free shell consists essentially of a magnetically responsive material, or both the adhesive core and the tack-free shell consist essentially of a magnetically responsive material.

3. The coated substrate of claim 1 wherein each adhesive bead consists essentially of a pressure-sensitive adhesive core and a tack-free shell therearound wherein the shell consists essentially of a magnetically responsive material.

4. The coated substrate of claim 1 wherein each adhesive bead consists essentially of a pressure-sensitive adhesive core and a tack-free continuous shell consisting essentially of magnetically responsive material disposed about the core.

5. The coated substrate of claim 1 wherein for each adhesive bead the shell comprises a discontinuous shell.

6. The coated substrate of claim 1 wherein for each adhesive bead the shell comprises a continuous shell.

* * * * *

UNITED STATES PATENT AND TRADEMARK OFFICE
CERTIFICATE OF CORRECTION

PATENT NO.: 5,599,618
DATED: Feb. 4, 1997
INVENTOR(S): Callahan, Jr. et al.

It is certified that error appears in the above-identified patent and that said Letters Patent is hereby corrected as shown below:

On the title page, item [54] and Column 1;

"METHOD OF MAGNETICALLY AND/OR ELECTROSTATICALLY POSITIONING PRESSURE-SENSITIVE ADHESIVE BEADS AND MAGNETICALLY POSITIONABLE PRESSURE-SENSITIVE"

should read

--METHOD OF MAGNETICALLY AND/OR ELECTROSTATICALLY POSITIONING PRESSURE-SENSITIVE ADHESIVE BEADS AND MAGNETICALLY POSITIONABLE PRESSURE-SENSITIVE ADHESIVE BEADS--

Signed and Sealed this

Twenty-fourth Day of August, 1999

*Attest:*

Q. TODD DICKINSON

*Attesting Officer*  *Acting Commissioner of Patents and Trademarks*